(12) United States Patent
Lee

(10) Patent No.: US 9,933,116 B2
(45) Date of Patent: Apr. 3, 2018

(54) VEHICLE FUEL GAS PRE-FILTER UNIT

(71) Applicant: Alternative Fuel Containers, LLC, Southfield, MI (US)

(72) Inventor: Joong-Kyu Lee, Chatham (CA)

(73) Assignee: Alternative Fuel Containers, LLC, Southfield, MI (US)

( * ) Notice: Subject to any disclaimer, the term of this patent is extended or adjusted under 35 U.S.C. 154(b) by 69 days.

(21) Appl. No.: 14/909,169

(22) PCT Filed: Aug. 2, 2014

(86) PCT No.: PCT/US2014/049507
§ 371 (c)(1),
(2) Date: Feb. 1, 2016

(87) PCT Pub. No.: WO2015/017845
PCT Pub. Date: Feb. 5, 2015

(65) Prior Publication Data
US 2016/0166968 A1    Jun. 16, 2016

Related U.S. Application Data

(60) Provisional application No. 61/861,467, filed on Aug. 2, 2013.

(51) Int. Cl.
*B01D 35/147*    (2006.01)
*B01D 35/153*    (2006.01)
(Continued)

(52) U.S. Cl.
CPC ............ *F17C 5/06* (2013.01); *B01D 46/2403* (2013.01); *B01D 46/4227* (2013.01);
(Continued)

(58) Field of Classification Search
CPC .. B01D 27/101; B01D 27/106; B01D 35/147; B01D 35/153; B01D 35/30;
(Continued)

(56) References Cited

U.S. PATENT DOCUMENTS 4,184,858 A * 1/1980 Walker .................. B01D 46/10
                                                                55/468
5,185,015 A    2/1993 Searle
(Continued)

FOREIGN PATENT DOCUMENTS

EP    2098718 A2    9/2009
EP    2478949 A2    7/2012
(Continued)

OTHER PUBLICATIONS

Extended European Search Report for Application No. 14832423.9 (PCT/US2014049507) dated Oct. 9, 2017; 6 pages.
(Continued)

*Primary Examiner* — Frank Lawrence, Jr.
*Assistant Examiner* — Minh-Chau Pham
(74) *Attorney, Agent, or Firm* — Reising Ethington P.C.

(57) ABSTRACT

A vehicle fuel gas pre-filter unit can include a housing, a filter, and an inlet valve. The housing is installed in a vehicle structure that includes an outlet valve. The filter is located in the housing and between the inlet and outlet valves with respect to fuel gas flow through the pre-filter unit. The inlet valve permits and prevents gas flow into the housing and has a valve head that opens and closes an inlet port. The outlet valve permits and prevents gas flow out of the housing and eventually to a vehicle fuel gas storage tank. The outlet valve has a valve head that opens and closes an outlet port.

20 Claims, 5 Drawing Sheets

(51) Int. Cl.

| | | |
|---|---|---|
| *B01D 35/30* | (2006.01) | |
| *F17C 5/06* | (2006.01) | |
| *F17C 11/00* | (2006.01) | |
| *B01D 46/24* | (2006.01) | |
| *B01D 46/42* | (2006.01) | |
| *B01D 46/52* | (2006.01) | |
| *F02M 21/02* | (2006.01) | |
| *F17C 5/00* | (2006.01) | |
| *B60K 15/03* | (2006.01) | |

(52) U.S. Cl.
CPC ....... *B01D 46/4272* (2013.01); *B01D 46/521* (2013.01); *F02M 21/0227* (2013.01); *F17C 5/007* (2013.01); *F17C 11/005* (2013.01); *F17C 11/007* (2013.01); B60K 2015/03019 (2013.01); F17C 2221/012 (2013.01); F17C 2221/033 (2013.01); F17C 2260/035 (2013.01); Y02E 60/321 (2013.01); Y02T 10/32 (2013.01)

(58) Field of Classification Search
CPC .......... B01D 2201/16; B01D 2201/162; B01D 2201/301; B01D 2201/4046; B01D 2201/4076; B01D 2201/4084; B01D 2201/4092
USPC .... 210/130, 136, 420, 429, 433.1, 440, 443; 55/490, 385.3, 510, 487, 520; 428/311.11, 220
See application file for complete search history.

(56) References Cited

U.S. PATENT DOCUMENTS

| | | | |
|---|---|---|---|
| 5,510,194 A | 4/1996 | Hendricks et al. | |
| 8,105,485 B2* | 1/2012 | Kolczyk | B01D 27/101 210/130 |
| 9,095,797 B2* | 8/2015 | Girondi | B01D 46/2411 |
| 2001/0005985 A1 | 7/2001 | Schueler | |
| 2003/0037520 A1* | 2/2003 | Sakagami | B01D 46/0031 55/482 |
| 2008/0138712 A1 | 6/2008 | Suzuki | |
| 2008/0245037 A1* | 10/2008 | Rogers | B01D 39/163 55/385.3 |
| 2009/0094951 A1 | 4/2009 | Baseotto et al. | |
| 2012/0167534 A1* | 7/2012 | Munkel | B01D 46/0031 55/385.3 |
| 2014/0150388 A1* | 6/2014 | Girondi | B01D 46/2411 55/504 |
| 2015/0013289 A1* | 1/2015 | Hasenfratz | F02M 35/02416 55/497 |
| 2016/0146160 A1* | 5/2016 | Lee | F02M 25/0854 123/519 |

FOREIGN PATENT DOCUMENTS

| | | |
|---|---|---|
| EP | 2532873 A1 | 12/2012 |
| JP | 2011026994 | 2/2011 |
| WO | 2015080312 A1 | 6/2015 |

OTHER PUBLICATIONS

Search Report and Written Opinion of the International Searching Authority (ISA/KR) for PCT/US2014/049506 dated Nov. 25, 2014.

* cited by examiner

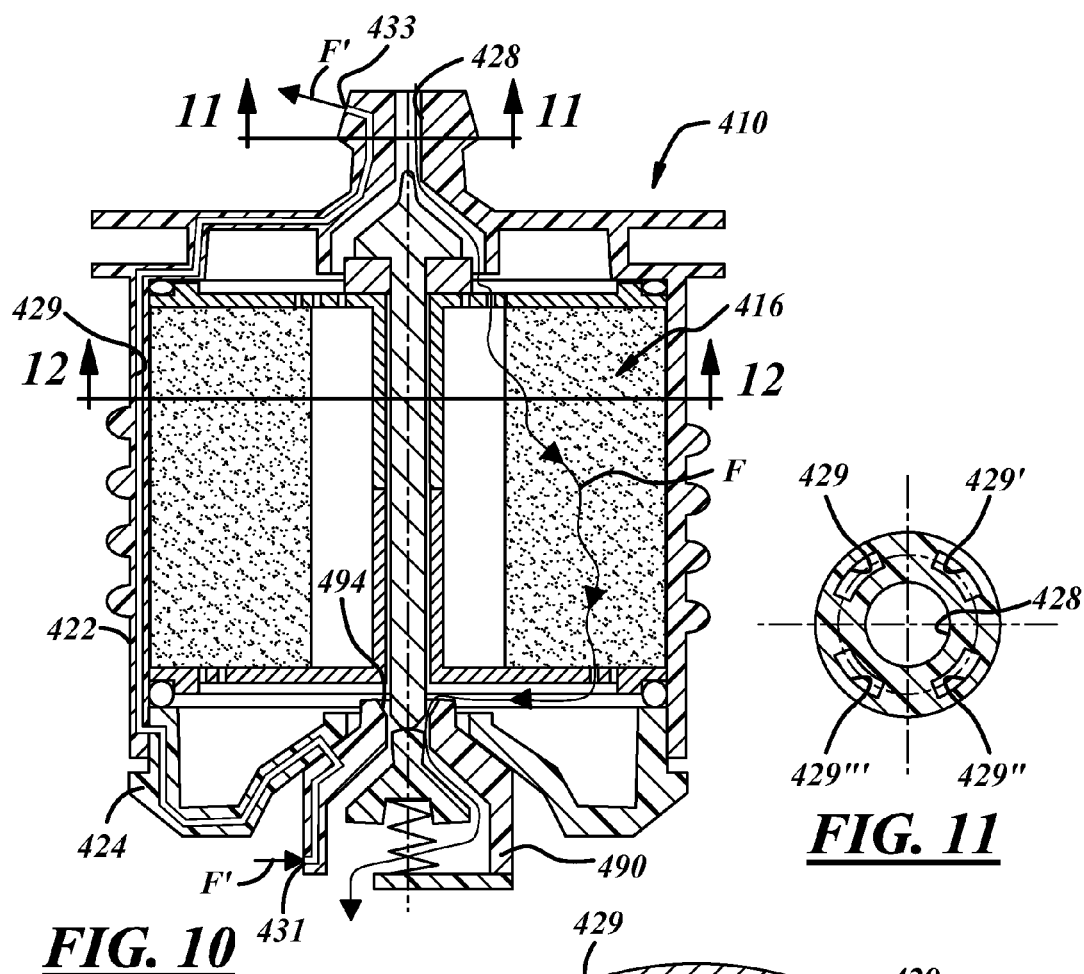
FIG. 10
FIG. 11
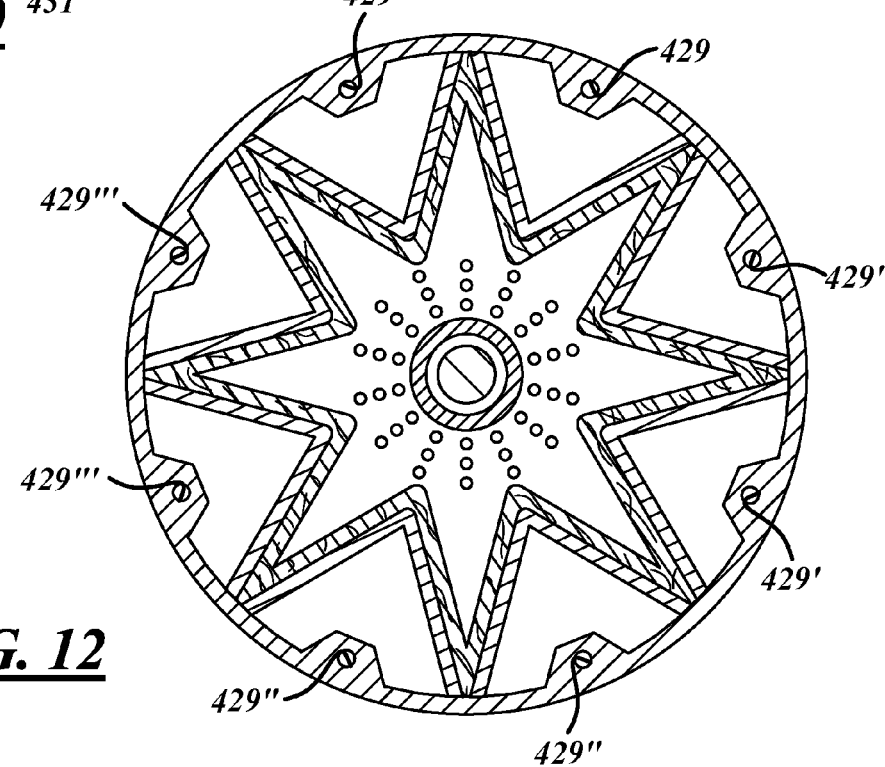
FIG. 12

VEHICLE FUEL GAS PRE-FILTER UNIT

CROSS-REFERENCE TO RELATED APPLICATIONS

This application claims the benefit of U.S. provisional patent application No. 61/861,467 filed on Aug. 2, 2013.

TECHNICAL FIELD

The technical field of this disclosure relates generally to alternative fuel gas storage systems equipped in vehicles and, more particularly, to constructions for introducing a fuel gas into storage tanks when filling the tanks.

BACKGROUND

Alternative fuel gasses, such as natural gas and hydrogen, are promising alternatives to the traditional petroleum-based energy sources used in automotive vehicles. They are cleaner burning than petroleum-based gasoline and diesel, and are therefore better for the environment. Two prevailing technologies exist for storing fuel gasses aboard a vehicle—in a compressed state or on a gas storage material. Compressed natural gas, for example, is stored at high pressure to less than 1% of the volume it would normally occupy at standard temperature and pressure. Natural gas can also be stored on a storage material (ANG storage material) in an adsorbed state. The allure of such ANG storage materials is that can reversibly adsorb natural gas at an energy density comparable to compressed natural gas but at a much lower tank pressure.

In ANG technologies, example ANG storage materials include activated carbon, metal-organic-frameworks (MOFs), and porous polymer networks (PPNs). The ANG materials are commonly contained in a vehicle storage tank that is filled and refilled with natural gas for adsorption. One issue presented during refilling events involves the susceptibility of certain ANG materials to degradation. Some contaminants have been shown to decrease the adsorption capabilities of the ANG materials, among other possible adverse effects. Contaminants encountered when refilling vehicle storage tanks with natural gas include moisture, dust from aged pipelines, oils and lubricants from prior processing equipment like compressors, and potentially other matter. Filters have been employed in upstream equipment, such as natural gas dispensers, to remove the contaminants from the refilled natural gas before the gas enters the vehicle storage tanks. But the filtering constructions to date exhibit shortcomings that make them undesirable and unsuitable in certain applications.

Storing hydrogen gas on a hydrogen storage material has similar thermodynamics to storing natural gas on an ANG storage material even though hydrogen uptake is chemical in nature—hydrogen is stored as a hydride—as opposed to adsorptive. Hydrogen gas, for instance, can be reversibly charged and released from a hydrogen storage material such as, for example, a complex metal hydride including various known alanates, borohydrides, and amides. Some specific complex metal hydrides include sodium alanate ($NaAlH_4$), lithium alanate ($LiAlH_4$), lithium borohydride ($LiBH_4$) with or without $MgH_2$, calcium borohydride ($CaBH_4$) with or without $MgH_2$, and lithium amide ($LiNH_2$). MOFs and PPNs may also be used to store hydrogen gas. There are, of course, many other hydrogen storage materials that are commercially available. And, much like with ANG storage materials, hydrogen storage materials can be susceptible to a decline in hydrogen uptake capabilities if exposed to contaminants such as, for example, hydrogen sulfide, which may find their way into the hydrogen gas flow being delivered to the hydrogen gas storage tank that houses the hydrogen storage material.

SUMMARY OF THE DISCLOSURE

In one embodiment, a vehicle fuel gas pre-filter unit includes a housing, a filter, a first valve head, and a valve stem. The housing has an inlet port and an outlet opening. The filter is located in the housing between the inlet port and the outlet opening. The first valve head is situated near the inlet port and mates with the inlet port when the first valve head is brought to a closed state. The valve stem extends from the first valve head and is engageable with a second valve head that closes an outlet port of a valve body. The second valve head and valve body permit and prevent gas flow out of the vehicle fuel gas pre-filter unit. When installed, the outlet opening of the housing is mated with the valve body. And when used in operation, when the first valve head is brought to an open state the second valve head is also brought to an open state by way of the engagement between the valve stem and the second valve head.

In another embodiment, a vehicle fuel gas pre-filter unit installed on a vehicle includes a pre-filter unit and an outlet valve. The pre-filter unit includes a housing, an inlet valve, and a filter. The housing can be installed in the vehicle structure, and can be uninstalled from the vehicle structure. The inlet valve permits and prevents gas flow into the housing, and has an inlet valve head that opens and closes an inlet port of the housing. The filter is located within the housing and receives gas flow downstream the inlet valve. The outlet valve permits and prevents gas flow out of the housing downstream the filter. The outlet valve has an outlet valve head that opens and closes an outlet port. The outlet valve has a spring that biases the outlet valve head to close the outlet port. When the housing is uninstalled from the vehicle structure, the outlet valve head is biased to close the outlet port by way of the spring.

In yet another embodiment, a vehicle fuel gas pre-filter unit includes a housing, an inlet valve head, an inlet valve stem, and a filter. The housing has a body and an end cover. The end cover can be detached from the body and defines a reservoir. The inlet valve head opens and closes an inlet port in order to permit and prevent gas flow into the housing. The inlet valve stem extends from the inlet valve head. The inlet valve stem is engageable with an outlet valve head that opens and closes an outlet port in order to permit and prevent gas flow out of the housing. When the inlet valve head moves to open the inlet port, the outlet valve head also moves to open the outlet port. The filter is located in the body of the housing. The filter removes contaminants from gas flow traveling through the body, and at least some of the removed contaminants are received in the reservoir. The end cover is detached from the body in order to empty the contaminants from the reservoir. And the filter can be removed from the body when the end cover is detached from the body.

BRIEF DESCRIPTION OF THE DRAWINGS

FIG. 10 is a sectional view of another embodiment of a vehicle fuel gas pre-filter unit;

FIG. 11 is a sectional view of the vehicle fuel gas pre-filter unit taken at arrows 11-11 in FIG. 10; and FIG. 12 is a sectional view of the vehicle fuel gas pre-filter unit taken at arrows 12-12 in FIG. 10.

Figures 1, 2, 3:
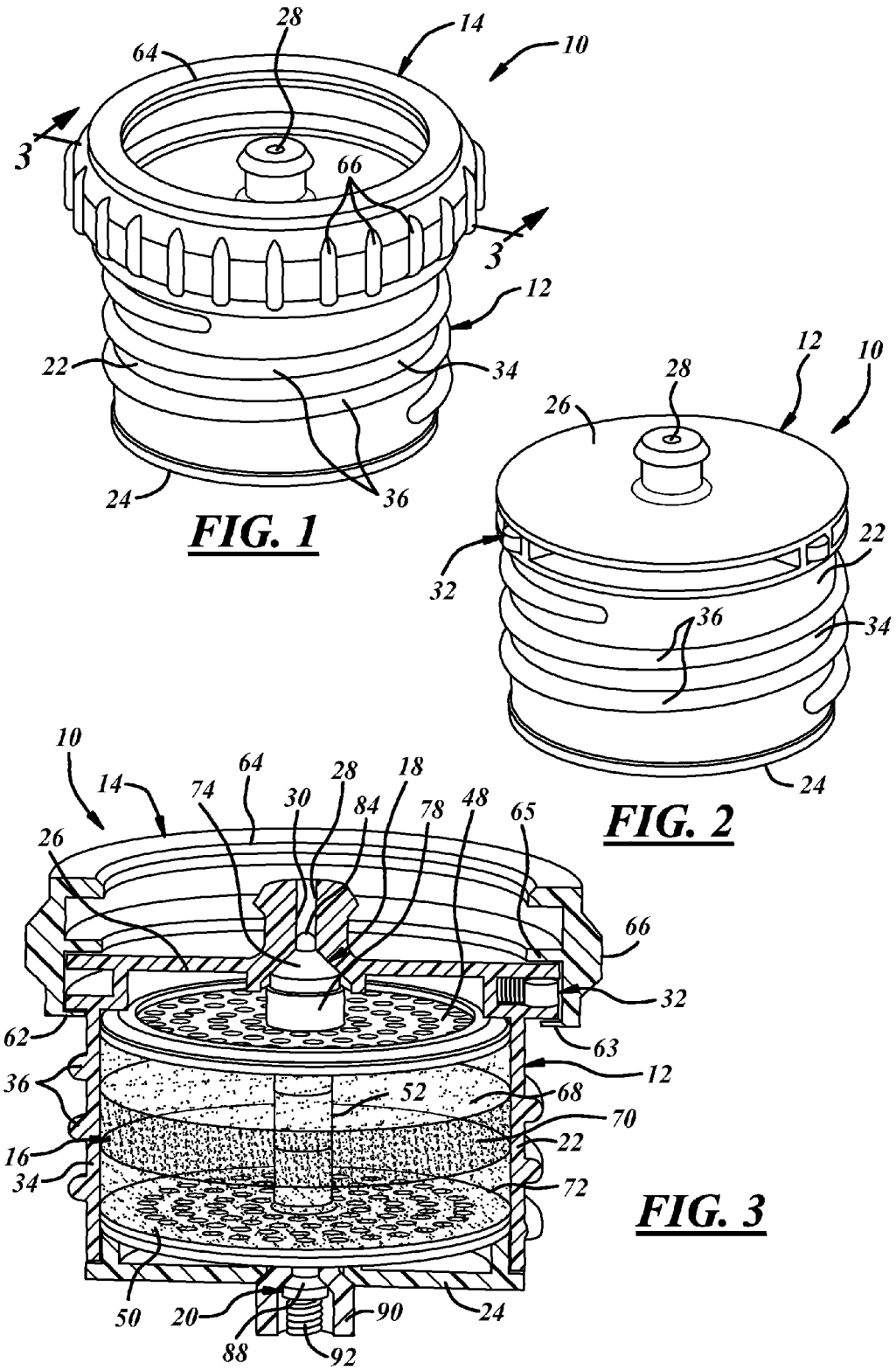
FIG. 1 is a perspective view of an embodiment of a vehicle fuel gas pre-filter unit, the vehicle fuel gas pre-filter unit depicted with a cap.
FIG. 2 is a perspective view of the vehicle fuel gas pre-filter unit of FIG. 1, this view omitting the cap.
FIG. 3 is a sectional view of the vehicle fuel gas pre-filter unit taken at arrows 3-3 in FIG. 1.

Some of the FIGS. 1-12 are cross-sectional views that show components with sectional lines. The sectional lines depicted in those Figures are intended to help visually differentiate the components shown; they are not meant to designate materials of the sectioned components or have any other purpose beyond what is described herein.

DETAILED DESCRIPTION

The disclosed fuel gas pre-filter units address shortcomings exhibited by previously-known fuel gas filtering constructions when refilling a vehicle gas storage tank with, for instance, natural gas or hydrogen. Although described in greater detail below, the fuel gas pre-filter units can be easily installed on a vehicle structure. They can also be uninstalled to replace their filters and to empty any liquid that could have accumulated inside the units. In some cases, the uninstalling procedure can be performed readily by a user who has not been professionally trained and without tooling. And when uninstalled, an outlet port that allows fuel gas to pass through the pre-filter unit during filling events automatically closes with no independent actuation. The fuel gas pre-filter units can be equipped in automobiles, as well as other vehicles having storage tanks that are refilled with fuel gas. The term "pre-filter" as used herein merely refers to the filtering functionality of the unit before the fuel gas is fed into the vehicle gas storage tank. And, unless otherwise specified, the terms radially, axially, and circumferentially refer to directions with respect to the generally cylindrical and circular shape of the fuel gas pre-filter unit and its components.

The pre-filter units shown in the Figures and described below are discussed with reference to natural gas as the applicable alternative fuel gas. Despite the fact that the following description of preferred exemplary embodiments of the fuel gas pre-filter units are described in the context of natural gas and vehicle gas storage tanks equipped to store ANG, those skilled in the art will nonetheless understand and recognize that the pre-filter units shown and described are also suitable to function in the context of hydrogen gas and vehicle gas storage tanks equipped to store hydrogen gas. Both natural gas and hydrogen gas are alternative fuel gasses that can be stored, respectively, on ANG and hydrogen storage materials. The pre-filter units described herein help improve and maintain the ability of the gas storage materials to store useable amounts of their respective fuel gasses.

FIGS. 1-5 illustrate one embodiment of a natural gas pre-filter unit 10 (hereafter "pre-filter unit") that is used to filter natural gas being fed into a vehicle storage tank. Natural gas is a combustible fuel whose largest gaseous constituent is methane ($CH_4$). The preferred type employed here is refined natural gas that includes greater than 90 wt. %, and preferably greater than 95 wt. %, methane. The remaining 5 wt. % or less may include varying amounts of natural impurities—such as other higher-molecular weight alkanes, carbon dioxide, and nitrogen—and/or added impurities. The pre-filter unit 10 removes contaminants that may be present in the natural gas such as moisture (i.e., diffused or entrained water), hydrogen sulfide ($H_2S$), dust from aged pipelines, oils and lubricants from upstream processing equipment like compressors, as well as other unwanted matter. The pre-filter unit 10 can have different designs, constructions, and components depending on the application in which the unit is equipped. In the embodiment presented here, the pre-filter unit 10 includes a housing 12, a cap 14, a filter 16, and an inlet valve 18. An outlet valve 20 is supported on the vehicle and is received by the pre-filter unit 10 when the unit 10 is installed on the vehicle.

The housing 12 is installed in the accompanying vehicle and carries the filter 16. In this embodiment, the housing 12 has a multi-piece construction that includes a body 22 and an end cover 24. At a top wall 26, the body 22 has an inlet port 28 for receiving natural gas from a refilling nozzle. The inlet port 28 presents a passage for admitting natural gas fluid flow into the housing 12, and is defined in part by a surface 30 having a cylindrical contour. Around a periphery of the top wall 26, the body 22 may have a construction that interacts with the cap 14 to preclude over-torquing of the cap 14 and, at the same time, provides notice (e.g., clicking sound and noticeable slip) to the user that the pre-filter unit 10 is sufficiently tightened down, as described in greater detail below in connection with the cap 14. At a sidewall 34, the body 22 has a set of external threads 36 for fastening and unfastening the pre-filter unit 10 to and from a vehicle structure 38. The pre-filter unit 10 is installed and uninstalled at the vehicle structure 38 via the threads 36. Still, the threads could be provided on the vehicle structure 38 in which case the body 22 would have corresponding grooves, or the pre-filter unit 10 could be installed and uninstalled by way of another construction. The vehicle structure 38 can be a vehicle frame, and can be in communication with a filler neck or other conduit leading to the on-board natural gas storage tank, or it can be part of the natural gas storage tank itself or an intermediate structure that leads to the storage tank.

Figure 4:
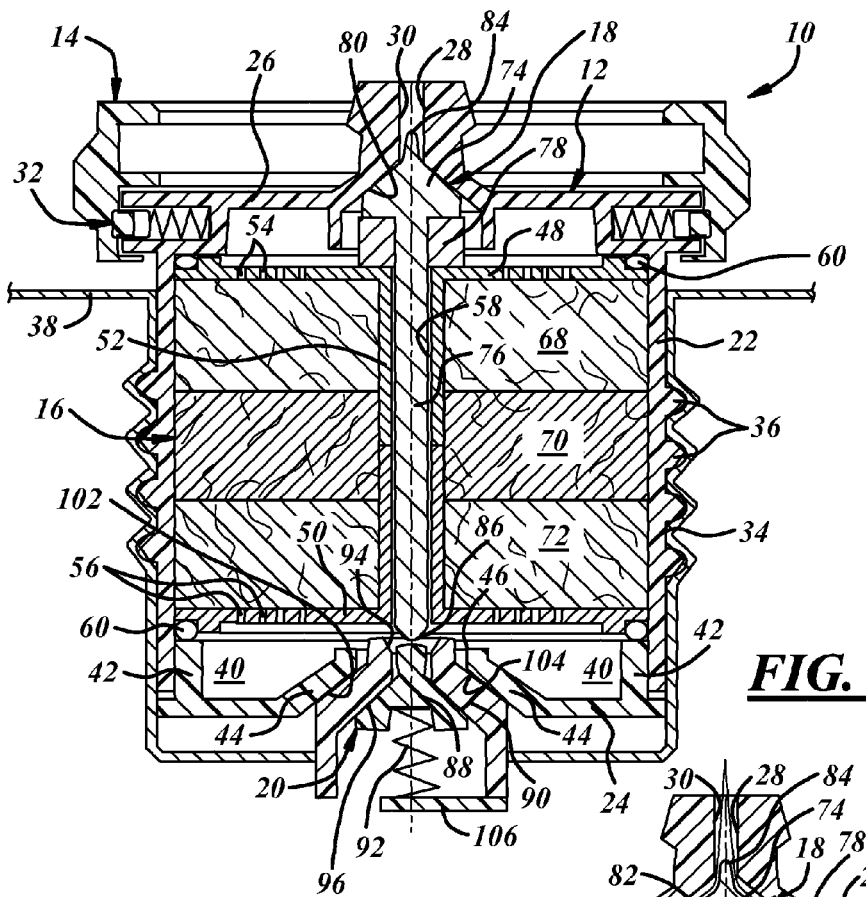
FIG. 4 is a sectional view of the vehicle fuel gas pre-filter unit of FIG. 1 shown in a closed state.

The end cover 24 of the housing 22 partly closes an otherwise open end of the body 22. Referring particularly to FIGS. 3 and 4, the end cover 24 has a disk-like shape that can be inserted into the open end of the body 22 for attachment with the body 22. The attachment between the end cover 24 and body 22 is non-permanent so that the end cover 24 can be detached from the body 22 for removing and replacing the filter 16 and emptying accumulated contaminants, and then be re-attached. The attachment can be carried out in different ways including by threading or another technique that permits a non-permanent attachment. Also, a seal can be established between the body 22 and the end cover 24 upon attachment of the end cover 24 to prevent natural gas from escaping the housing 12.

Further, in the embodiment presented, a reservoir 40 is defined in part by upright and slanted walls 42, 44 of the end cover 24. The reservoir 40 provides an annular space for holding accumulated contaminants such as water and other liquid that is removed from the filtered natural gas. Because the reservoir 40 is situated below an entrance of the outlet valve 20, any liquid that may gather tends to settle in the reservoir 40 and around the outlet valve 20 instead of making its way to the entrance of the outlet valve 20 where it can interfere with natural gas flow through the pre-filter unit 10. The reservoir 40 can be emptied of its accumulated contaminants upon detachment of the end cover 24. Inward of the reservoir 40, the end cover 24 defines an outlet opening 46. The outlet opening 46 receives partial insertion of the outlet valve 20, as depicted best in FIGS. 4 and 5, and an underside of the slanted wall 44 mates with the outlet valve 20 and forms a surface-to-surface seal therewith.

The housing 12 includes an internal structure for providing added support that carries the filter 16. In the embodiment shown here, a first plate 48 and a second plate 50 hold the filter 16 in place, and a sleeve 52 extends between the first and second plates 48, 50. The first plate 48 has a set of perforations 54 that present passages for natural gas entering the filter 16, and the second plate 50 similarly has a set of perforations 56 that present passages for natural gas exiting the filter 16. The perforations 54, 56—especially those of the second plate 50—can be positioned over the reservoir 40 so that removed contaminants are delivered into the reservoir 40. The plates 48, 50 have a disk-like shape. And the sleeve 52 defines a cylindrical space 58 that accommodates linear and reciprocal movement of the inlet and outlet valves 18, 20. Seals 60 in the form of o-rings can be provided between the plates 48, 50 and body 22 and cover 24, as well as at other locations.

The cap 14 is connected to the housing 12 so that a user can fasten and unfasten the pre-filter unit 10 to and from the vehicle structure 38. Referring to FIGS. 1 and 3, the cap 14 has an open bottom 62 and an open top 64. In this embodiment, a first flange 63 adjoins the open bottom 62 and a second flange 65 projects from a wall of the cap 14 about midway between the open bottom and open top 64. The flanges 63, 65 extend radially inwardly and axially sandwich an upper construction of the housing 12 that includes the top wall 26. The open top 64 reveals the inlet port 28 and inlet valve 18 and permits access to them for the refilling nozzle. Opposite the flanges 63, 65, the cap 14 has a set of gripping structures 66 meant to be grasped by a user when fastening and unfastening. The gripping structures 66 can be a set of ribs disposed around the cap 14 as shown best in FIG. 1.

The cap 14 is interconnected to the housing 12 so that, as the user grasps and turns the cap, the housing 12 turns simultaneously with the cap 14. When the housing 12 reaches its fully fastened condition, a spring-and-pin assembly 32 can slip and click as an indication to the user to cease turning. The spring-and-pin assembly 32 can be designed to permit the interconnection between the cap 14 and housing 12 to fasten and unfasten the pre-filter unit 10. In other words, once the housing 12 is fully fastened and opposition to turning is encountered, the assembly 32 slips and clicks and precludes further tightening of the housing 12, while at the same time allowing the cap 14 to rotate relative to the housing 12 coincident with distinctive clicking sounds. Other indications and attendant constructions are possible in other embodiments.

The filter 16 is located in the housing 12 and is used to remove contaminants from natural gas passing through the pre-filter unit 10. The filter 16 can have different designs and can be constructed of different media and materials based on—among other considerations—the application in which the pre-filter unit 10 is used, the desired degree of filtration, the velocity of natural gas flow passing through the filter 16, and the expected amount and type of contaminants to be encountered during filtration. Contaminants removed by the filter 16 may include moisture (i.e., water), hydrogen sulfide, and certain pentane-plus materials (i.e., C5 and greater hydrocarbons) found in compressor lubricants, among others.

The filter 16 may include a coalescing filter material, a desiccant filter material, or both. Each of those types of filter materials scrubs water, as well as other contaminants, from the natural gas flow that passes through it. A coalescing filter material is one that coalesces water particles, even finely diffused ones, into larger water droplets that, once formed, simply fall out of the filter material through gravity. Examples of suitable coalescing filters are those that include microfiber glass, borosilicate glass, cellulose, and many other materials, many of which are commercially available. A desiccant filter material is one that hydroscopically sorbs (adsorption or absorption) water molecules within its material structure. Some examples of suitable desiccant filter materials are silica- or silicate-based desiccants as well as hydrophilic zeolites such as, for example, ZSM-5. Like coalescing filter materials, desiccant filter materials are widely commercially available. Moreover, in addition to the coalescing filter material and/or the desiccant filter material, the filter may also include a mechanical filter that does not necessarily remove moisture from the natural gas flow.

Figure 5:
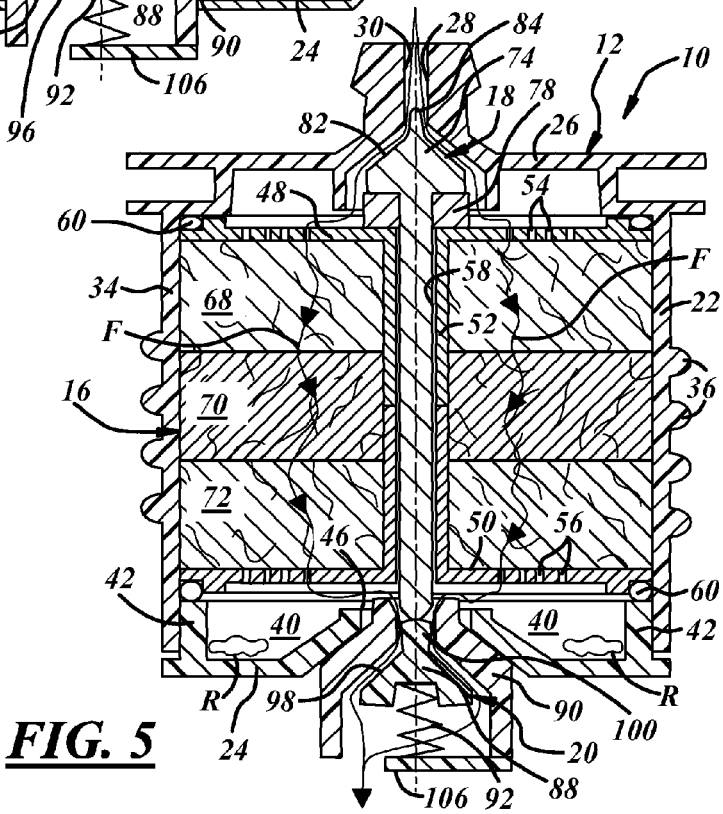
FIG. 5 is a sectional view of the vehicle fuel gas pre-filter unit of FIG. 1 shown in an open state.

In the embodiment of FIGS. 3-5, the filter 16 includes a multi-layered configuration. The multi-layered configuration may be suitable in refilling applications in which the natural gas quality has greater uncertainty such as with at-home refilling, as opposed to natural gas at commercial fueling stations where quality may be better controlled. The multi-layered configuration may also be suitable in refilling applications in which a longer duration of refilling is acceptable, such as overnight at-home refilling. Still, the multi-layered configuration is not limited to these applications.

The multi-layered filter configuration, as shown, may include a first filter layer 68, a second filter layer 70, and a third filter layer 72. The filter layers 68, 70, 72 may be selected to provide successively finer filtration moving from the first filter layer 68 through the third filter layer 72, if desired, but do not have to be. When this multi-layered configuration is employed, natural gas flow enters the first filter layer 68 initially, then passes through the second filter layer 70, and eventually comes upon and passes through the third filter layer 72. The first, second, and third filter layers 68, 70, 72 may be composed of different media and material relative to one another, and could have different thicknesses relative to one another. For instance, the first filter layer 68 could be composed of a glass fiber material, the second filter layer 70 could be composed of a coalescing filter material or a desiccant filter material, and the third filter layer 72 could be composed of another glass fiber material or the same glass fiber material as the first filter layer 68. Still, there could be a different quantity of filter layers such as a single layer or two layers or four layers, and the different filter layers could filter different contaminants such as one layer for solid removal and another layer for lubricant removal and yet another layer for water removal. Together, the first, second, and third filter layers 68, 70, 72 make up a mostly solid cylindrical shape with a cylindrical space at its center placed around the sleeve 52. The first, second, and third layers 68, 70, 72 are all interposed between the first and second plates 48, 50 in this embodiment.

The inlet valve 18 permits and prevents natural gas flow into the housing 12 from the refilling nozzle. The inlet valve 18 is moveable between a closed state (FIG. 4) in which natural gas does not flow through the inlet valve 18 and an open state (FIG. 5) in which natural gas is free to pass through the inlet valve 18. The inlet valve 18 can have different designs, constructions, and components based in part upon the design and construction of the housing 12 and that of the outlet valve 20. Referring to FIGS. 3-5, for example, in the embodiment presented here, the inlet valve 18 has a valve head 74, a valve stem 76, and a compressible seal 78.

The valve head 74 mates with the inlet port 28 and seats against a surface 80 of the inlet port 28 to form a surface-to-surface seal thereat when the inlet valve 18 is in its closed state. The valve head 74 therefore serves to plug the inlet port 28 in the closed state. An outer surface 82 of the valve head 74 is conical and matches the surface 80 of the inlet port 28, which is also conical. By these interactions, the top wall 26 of the body 22 serves as the valve body for the inlet valve 18. At its terminal end, the valve head 74 has a somewhat pointed and extended nose 84 that may be acted upon by the refilling nozzle when the inlet valve 18 is urged open during a fill-up. The valve stem 76 extends axially from a backside of the valve head 74. As illustrated in the Figures, the valve stem 76 can be an elongated unitary extension of the valve head 74, and can span almost the full extent of the housing 12 from the valve head 74 to the outlet valve 20. The sleeve 52 receives the valve stem 76 through the cylindrical space 58.

A terminal end 86 of the valve stem 76 directly engages the outlet valve 20 via surface-to-surface engagement when the inlet valve 18 moves to the open state. The engagement gives substantially concurrent and corresponding opening and closing movements between the inlet and outlet valves 18, 20, as described in more detail below. In the closed state, the terminal end 86 need not be in exact abutment with the outlet valve 20, and instead can be spaced slightly from it as depicted in FIG. 4. The spacing may be preferable in circumstances where imperfect manufacturing could result in a valve stem 76 that keeps the outlet valve 20 open even when the inlet valve 18 is closed due to the valve stem 76 being too long. The spacing, however slight and if provided, may result in a slight delay from when the inlet valve 18 begins its opening movement and when the outlet valve 20 begins its opening movement.

The compressible seal 78 is inserted over the valve stem 76 at the backside of the valve head 74. The seal 78 can be composed of a rubber material or some other material, and can be compressed and squeezed during valve opening so that it does not interfere with valve movement. When in place, the seal 78 obstructs gas flow through the cylindrical space 58. Together, the seals 60, 78 preclude natural gas from bypassing the filter 16 as the gas flows through the housing 12 from the inlet valve 18 to the outlet valve 20. In this way the natural gas refilling the vehicle storage tank is compelled through the filter 16. If spacing exists between the valve stem 76 and outlet valve 20, the seal 78 biases and maintains the valve head 74 in its closed state even though the valve stem 76 is not being urged closed by the outlet valve 20.

The outlet valve 20 permits and prevents natural gas flow out of the housing 12 and downstream to the natural gas storage tank. The outlet valve 20 moves between a closed state (FIG. 4) in which natural gas does not flow through the outlet valve 20 and an open state (FIG. 5) in which natural gas is free to pass through the outlet valve 20. The outlet valve 20 can have different designs, constructions, and components based in part upon the design and construction of the housing 12 and that of the inlet valve 18. Referring to FIGS. 3-5, for example, in the embodiment presented here, the outlet valve 20 has a valve head 88, a valve body 90, and a spring 92.

The valve head 88 mates with an outlet port 94 that presents a passage for exiting natural gas fluid flow out of the housing 12. The outlet port 94, as shown in FIG. 4, is defined at least in part by a surface 96 of the valve body 90. And when the outlet valve 20 is in its closed state, the valve head 88 seats against the surface 96 of the valve body 90 to form a surface-to-surface seal thereat. The valve head 88 therefore serves to plug the outlet port 94 in the closed state. Depending on the embodiment, the outlet port 94 may also constitute an inlet port of the vehicle storage tank.

An outer surface 98 of the valve head 88 is conical and matches the surface 96 of the valve body 90, which is also conical. At its terminal end, the valve head 88 has a nose 100 that is somewhat blunted and that is engaged by the valve stem 76 when the outlet valve 20 is urged open by the inlet valve 18. The valve body 90 remains static amid the opening and closing movements of the valve head 88 and may be an extension of the vehicle structure 38 or, alternatively, it may be a discrete component that is installed on the vehicle structure 38. Opposite the surface 96, the valve body 90 has a surface 102 that in this embodiment is conical and matches a surface 104 of the slanted wall 44, which is also conical. The valve body 90 is received in the outlet opening 46 and the surfaces 102, 104 form a surface-to-surface seal as illustrated in FIGS. 4 and 5.

The spring 92 exerts a force against the valve head 88 to bias the valve head toward the valve body 90. The outlet valve 20 is consequently urged toward its closed state. The spring rate of the spring 92 can be selected to yield to an opposing force exerted by the valve stem 76 of the inlet valve 18 when the refilling nozzle opens the inlet valve 18. In the embodiment presented here, the spring 92 extends between the valve head 88 and a wall 106 beneath the valve head, and abuts both. The wall 106 could be part of the vehicle structure 38, a part of the valve body 90, or could be another structure. Depending on the application and the components and construction adjoining the spring 92, the spring 92 can be a coil spring, a helical spring, a wave spring, a Belleville washer, a leaf spring, or some other type of spring.

When refilling the vehicle storage tank with natural gas, the user brings the refilling nozzle to the pre-filter unit 10 and the end of the refilling nozzle engages the inlet valve 18 and urges it open. At this time, the valve head 74 is pushed axially downward, with reference to directions defined in FIGS. 4 and 5, and the compressible seal 78 is squeezed by the backside of the valve head 74 and against the first plate 48 as the valve head 74 becomes unmated and unseated from the surface 80 of the inlet port 28. While these actions are occurring, the terminal end 86 of the valve stem 76 comes into direct surface-to-surface engagement with the nose 100 of the valve head 88 of the outlet valve 20. The valve head 88 then becomes unmated and unseated from the surface 96 of the outlet port 94. The outlet valve 20 is hence also urged to its open state indirectly by the refilling nozzle as the refilling nozzle comes into engagement with the inlet valve 18. FIG. 5 shows both the inlet valve 18 and outlet valve 20 in their open states.

When the inlet valve 18 is urged to its open state, natural gas from the refilling nozzle travels through the pre-filter unit 10 from the inlet port 28 to the outlet port 94. The fluid flow of the natural gas is represented in FIG. 5 by the arrowed lines denoted by the letter F. The fluid flow F enters the inlet port 28 and passes through the perforations 54 of the first plate 48 and passes into the filter 16. As the fluid flow F makes its way through the filter 16, certain contaminants are removed out of the natural gas, depending on the media and materials of the filter. Some of the removed contaminants, such as certain liquids, in particular water, can drip into the reservoir 40 and collect in the reservoir 40, especially if a coalescing filter material is included in the filter 16. The removed contaminants are represented in FIG. 5 by the items denoted by the letter R. The fluid flow F continues past the filter 16 and through the perforations 56 of the second plate 50. Finally, the fluid flow F—now filtered—exits the outlet port 94 and travels downstream to the vehicle natural gas storage tank.

The pre-filter unit 10 is designed and constructed so that it can be manipulated by a user who has not been professionally trained and without having to make use of tooling. In other words, an average consumer of an automobile, for instance, is meant to carry out the actions necessary to refill the vehicle storage tank and replace the filter 16 and empty the reservoir 40 as needed. To uninstall the pre-filter unit 10 from the vehicle structure 38, the user grasps the gripping structures 66 by hand and turns the cap 14 in the unfastening rotational direction (e.g., counterclockwise). The housing 12 turns with the cap 14 and its external threads 36 are unfastened from the vehicle structure 38. As the housing 12, cap 14, filter 16, and inlet valve 18 are being turned away from the outlet valve 20, the outlet valve 20 is kept closed without additional and affirmative actuation since the spring 92 is able to force the valve head 88 against the valve body 90 once the valve head 88 is no longer engaged by the valve stem 76. In this way, natural gas cannot escape the outlet port 94 when the pre-filter unit 10 is uninstalled. This differs from previously-known filtering constructions that employ independent actuation of downstream shut-off valves before uninstallation procedures are initiated.

Once the pre-filter unit 10 is separated from the vehicle structure 38, the end cover 24 can be detached from the body 22 of the housing 12 for replacing the filter 16 and/or emptying the reservoir 40 of any accumulated contaminants R. In an example with a threaded connection, the end cover 24 is unfastened from the body 22 by hand. Accumulated contaminants R in the reservoir 40 can be disposed of in an appropriate way, and the filter 16 can be pulled out of the body 22 at the now open end of the body 22. The filter 16 can be refurbished and put back into the housing 12 for continued use, or the filter 16 can be replaced by another filter. The end cover 24 may then be re-attached to the body 22, again by hand fastening if the threaded connection is provided between the end cover 24 and body 22. The user can then install the pre-filter unit 10 in the vehicle structure 38 by grasping the gripping structures 66 and turning the cap 14 in the fastening rotational direction (e.g., clockwise). The housing 12 turns with the cap 14 and its external threads 36 are fastened with the vehicle structure 38. When the housing 12 reaches its fully fastened condition, the spring-and-pin assembly 32 slips and clicks and the user knows to stop turning. Now, the pre-filter unit 10 is ready for continued use.

Figure 6:
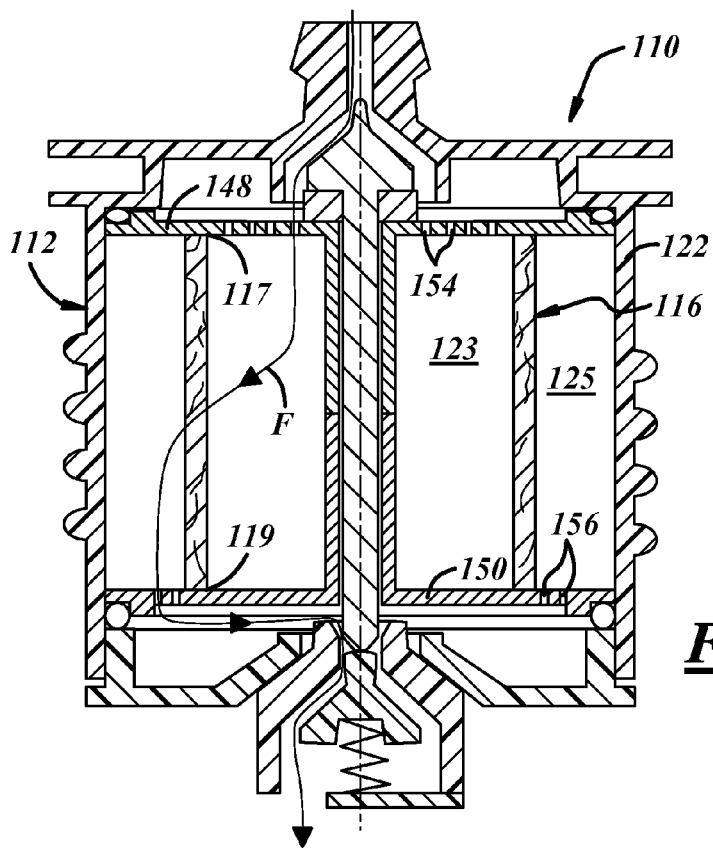
FIG. 6 is a sectional view of another embodiment of a vehicle fuel gas pre-filter unit.

FIG. 6 illustrates another embodiment of a natural gas pre-filter unit 110. The pre-filter unit 110 is similar in many respects to the pre-filter unit 10 described with reference to FIGS. 1-5, and not all of the similarities will be repeated here. The pre-filter unit 110 includes a filter 116 that has a different construction than the filter 16 of FIGS. 1-5. The filter 116 of FIG. 6 has a single layer configuration providing one level of filtration. The filter 116, as shown, has a hollow cylindrical shape with an open top 117 and an open bottom 119. The open top 117 sits against an underside of a first plate 148, while the open bottom 119 sits against a topside of a second plate 150. The cylindrical shape has a smaller diameter than that of a body 122 of a housing 112 so that the filter 116 partitions the interior of the body 122 into an inboard space 123 and an outboard space 125. Another difference with this embodiment involves the first and second plates 148, 150. Perforations 154 of the first plate 148 are situated radially-inwardly of the diameter of the filter 116 and hence lead natural gas fluid flow F into the inboard space 123. Perforations 156 of the second plate 150, in contrast, are situated radially-outwardly of the diameter of the filter 116 and hence receive natural gas fluid flow F from the outboard space 125. With the perforations 154, 156 at these locations, natural gas fluid flow F is compelled through the filter 116 as it travels through the pre-filter unit 110. The embodiment of FIG. 6 may be suitable for refilling applications with better controlled natural gas quality and shorter refilling durations—examples might include commercial fueling stations. These applications may not require more than one level of filtration.

Figure 7:
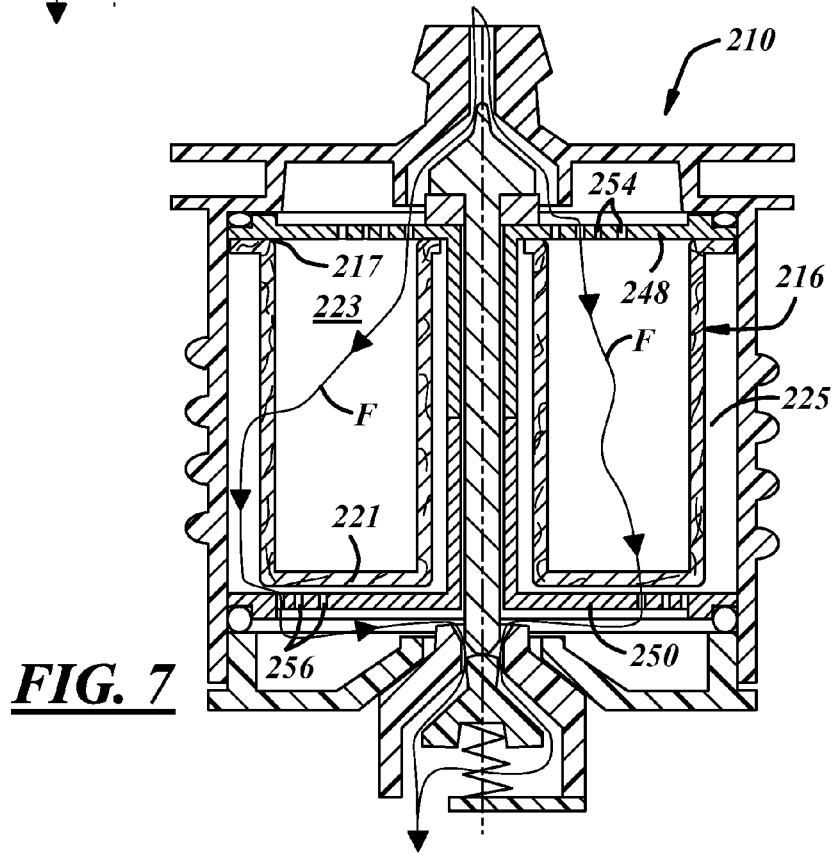
FIG. 7 is a sectional view of yet another embodiment of a vehicle fuel gas pre-filter unit.

FIG. 7 illustrates yet another embodiment of a natural gas pre-filter unit 210. The pre-filter unit 210 is similar in many respects to the pre-filter unit 110 of FIG. 6, and not all of the similarities will be repeated here. The pre-filter unit 210 includes a filter 216 with a single layer configuration providing one level of filtration. The filter 216 has a hollow cylindrical and bucket-like shape with an open top 217 and a closed bottom 221. The open top 217 sits against an underside of a first plate 248, while the closed bottom 221 is spaced slightly above a topside of a second plate 250. Similar as before, the shape of the filter 216 shape defines an inboard space 223 and an outboard space 225. Perforations 254 of the first plate 248 fluidly communicate natural gas directly with the inboard space 223, and perforations 256 of the second plate 250 fluidly communicate directly with the outboard space 225. Again here, natural gas fluid flow F is compelled through the filter 216 as it travels through the pre-filter unit 210. The embodiment of FIG. 7 may be suitable for commercial fueling station applications.

Figure 8:
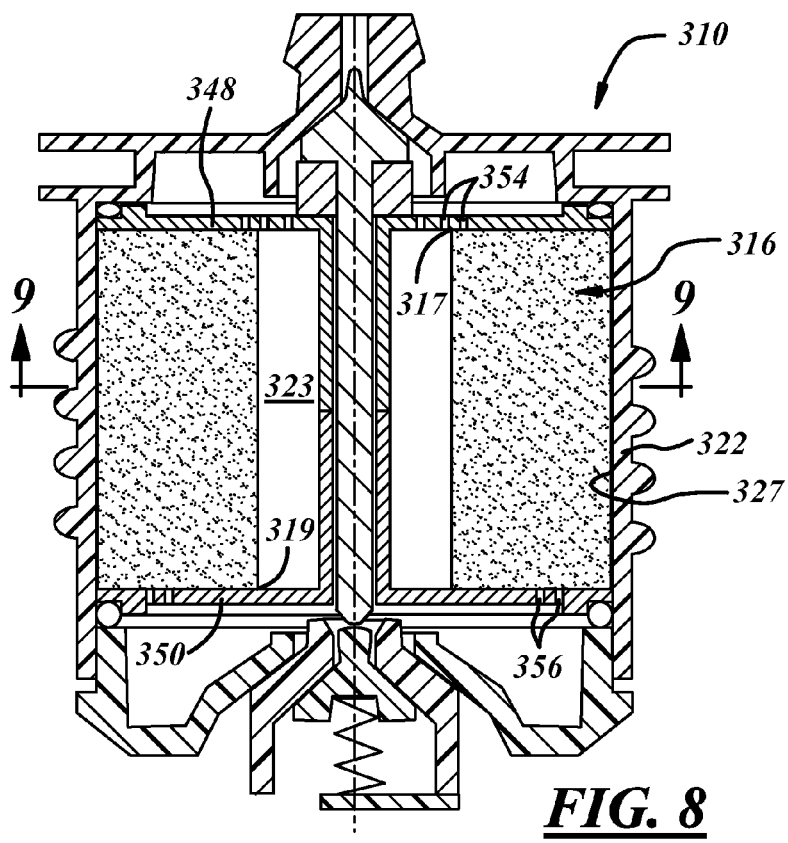
FIG. 8 is a sectional view of a further embodiment of a vehicle fuel gas pre-filter unit.
Figure 9:
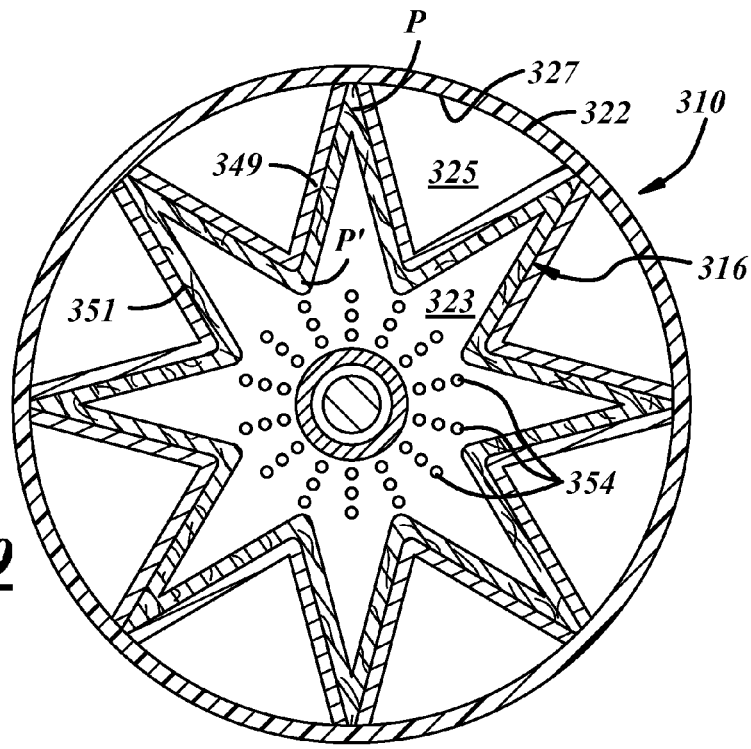
FIG. 9 is a sectional view of the vehicle fuel gas pre-filter unit taken at arrows 9-9 in FIG. 8.

FIGS. 8 and 9 illustrate a further embodiment of a natural gas pre-filter unit 310. The pre-filter unit 310 is similar in many respects to the pre-filter unit 110 of FIG. 6, and not all of the similarities will be repeated here. The pre-filter unit 310 includes a filter 316 with a single layer and pleated configuration providing one level of filtration. Eight exterior folds P and eight interior folds P' form the pleated configuration in the Figures here, but there could be different quantities of folds including many more in other embodiments. The exterior folds P sit against an inner surface 327 of a body 322 of the housing. The folds and resulting pleated configuration present more surface area for natural gas to pass through, and therefore may be able to handle a greater volume of natural gas fluid flow than other configurations with less surface area.

As shown in the Figures, the filter 316 has a general star-shape in sectional profile with an open top 317 and an open bottom 319. The open top 317 sits against an underside of a first plate 348, while the open bottom 319 sits against a topside of a second plate 350. The star-shape partitions the interior of the body 322 into an inboard space 323 and an outboard space 325. In this embodiment, the outboard space 325 is segmented into discrete sections by the exterior folds P and their abutment with the inner surface 327, although this need not always be the case. To help hold the filter 316 in place, a plate 349 may be provided. The plate 349 extends axially between the first and second plates 348, 350, and braces an outer surface 351 of the filter 316 against the forces and pressures exerted by incoming natural gas fluid flow. The plate 349 can be made up of individual plates with v-shaped sectional profiles as depicted in FIG. 9, or can be a one-piece structure with a star-shaped sectional profile matching that of the filter 316. In the embodiment here, the plate 349 has a set of perforations (not shown) throughout at least some of its extent to present passages for natural gas exiting the filter 316 and entering the outboard space 325. And, similar with the embodiments of FIGS. 6 and 7, perforations 354 of the first plate 348 fluidly communicate natural gas directly with the inboard space 323, and perforations 356 of the second plate 350 fluidly communicate directly with the outboard space 325. Natural gas fluid flow is compelled through the filter 316 as it travels through the pre-filter unit 310. The embodiment of FIGS. 8 and 9 may be suitable for commercial fueling station applications.

FIGS. 10-12 illustrate yet a further embodiment of a natural gas pre-filter unit 410. The pre-filter unit 410 is similar in many respects to the pre-filter unit 310 of FIGS. 8 and 9, and not all of the similarities will be repeated here. The pre-filter unit 410 includes a filter 416 with the single layer and pleated configuration described with reference to FIGS. 8 and 9. As before, the filter 416 has a general star-shape in sectional profile. The pre-filter unit 410, however, includes a passage 429 for presenting a path for natural gas fluid flow exiting the vehicle storage tank when refilling the tank to provide the functionality of a close-loop refilling procedure. The closed-loop filling procedure involves natural gas simultaneously entering and exiting the vehicle storage tank via the pre-filter unit 410—that is, natural gas fluid flow F enters the tank through the inlet port 428 of the unit 410 and flows through the filter 416 and out of the outlet port 494 of the unit 410 as previously described, while natural gas fluid flow F' exits the tank through the passage 429 at the same time. When employed, the procedure achieves a quicker refilling duration.

In the embodiment presented here, an inlet 431 of the passage 429 is located in the valve body 490 and an outlet 433 of the passage 429 is located near the inlet port 428. The inlet 431 can fluidly communicate with a downstream component transporting natural gas fluid flow that exits the vehicle storage tank, and the outlet 433 can fluidly communicate with a passage of the refilling nozzle. Both the inlet 431 and outlet 433 can have different locations, depending on the particular application and on downstream and upstream components. Here, between the inlet 431 and the outlet 433, the passage 429 is defined through a wall of the valve body 490, through a wall of the end cover 424, and through a wall of the body 422. And as depicted in FIG. 11, the pre-filter unit 410 can include multiple passages that present discrete paths for natural gas fluid flow exiting the vehicle storage tank. The multiple passages 429, 429', 429", and 429''' can be defined through the different walls of the pre-filter unit 410 at different circumferential locations around the pre-filter unit.

As depicted in FIG. 12, the passages 429, 429', 429", and 429''' can diverge along their extents from the outlet 433 to the inlet 431 into yet additional passages. Put another way, the passages 429, 429', 429", and 429''' can converge along their extents from the inlet 431 to the outlet 433. The divergence and/or convergence can occur at different locations along the extents of the passages, and can occur more than once, depending on the application. Although the passages 429, 429', 429", and 429''' are shown as eight separate passages in FIG. 12 that converge into four separate passages in FIG. 11, there could be any number of passages including more or less than eight and they need not diverge or converge along their extents. Moreover, the passage(s) 429 could be provided in other embodiments apart from that of FIGS. 10-12, including the embodiments of FIGS. 1-5, 6, and 7.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A vehicle fuel gas pre-filter unit, comprising:
a housing having an inlet port and an outlet opening;
a filter located in the housing between the inlet port and the outlet opening; and
an inlet valve that includes a first valve head and a valve stem extending from the first valve head, the first valve head being movable between a closed state of the inlet valve in which the first valve head is mated with the inlet port to prevent gas flow into the housing and an open state of the inlet valve in which the first valve head is not mated with the inlet port to permit gas flow into housing, the valve stem of the inlet valve further being engageable with a second valve head of an outlet valve, the outlet valve also including a valve body;
wherein, in installation, the outlet opening of the housing is mated with the valve body of the outlet valve, and wherein, in operation, when the inlet valve is in the open state and the first valve head is not mated with the inlet port of the housing, the second valve head is urged away from the valve body by the valve stem of the inlet valve to permit gas flow through the outlet opening of the housing and out of the vehicle fuel gas pre-filter unit.

2. The vehicle fuel gas pre-filter unit set forth in claim 1, wherein the housing has a set of external threads that are used to fasten the vehicle fuel gas pre-filter unit to a vehicle structure and that are used to unfasten the vehicle fuel gas pre-filter unit from the vehicle structure.

3. The vehicle fuel gas pre-filter unit set forth in claim 1, wherein the housing includes an end cover that defines the outlet opening, the end cover being detachable from a body of the housing for removing the filter from the housing.

4. The vehicle fuel gas pre-filter unit set forth in claim 1, wherein the vehicle fuel gas pre-filter unit is uninstallable from a vehicle structure, and when uninstalled the valve stem of the inlet valve and second valve head of the outlet valve are not engaged with each other and the outlet valve is in a closed state in which the second valve head is biased against the valve body.

5. The vehicle fuel gas pre-filter unit set forth in claim 1, wherein the housing includes a first plate with a plurality of perforations, a second plate with a plurality of perforations, and a sleeve that extends between the first and second plates and receives the valve stem that extends from the first valve head, the filter interposed between the first plate and the second plate, and, in operation, fuel gas passes through the perforations of the first plate and through the filter and through the perforations of the second plate as the fuel gas travels from the inlet port to an outlet port defined in the valve body of the outlet valve.

6. The vehicle fuel gas pre-filter unit set forth in claim 1, wherein the filter includes at least two layers of different filter material, is a cylindrical filter, or is a pleated filter.

7. The vehicle fuel gas pre-filter unit set forth in claim 1, wherein the housing has a passage extending through a wall of the housing between a location adjacent the inlet port and a location adjacent the outlet opening, the passage providing a path for gas flow exiting a vehicle fuel gas storage tank.

8. The vehicle fuel gas pre-filter unit set forth in claim 1, further comprising a cap interconnected to the housing for grasping by a user and installing the vehicle fuel gas pre-filter unit to a vehicle structure and uninstalling the vehicle fuel gas pre-filter unit from the vehicle structure, the cap including at least one spring that interacts with the housing to preclude over-torquing when installing the vehicle fuel gas pre-filter unit to the vehicle structure.

9. The vehicle fuel gas pre-filter unit set forth in claim 1, wherein the housing includes an end cover, the end cover presenting a reservoir located downstream the filter relative to gas flow, the reservoir accepting contaminants removed from the gas flow by the filter, the end cover being detachable from a body of the housing.

10. The vehicle fuel gas pre-filter unit set forth in claim 1, wherein the first valve head of the inlet valve is biased against the inlet port by a compressible seal.

11. A vehicle fuel gas pre-filter unit installed in a vehicle structure, comprising:
   a pre-filter unit including:
      a housing installable in the vehicle structure and uninstallable from the vehicle structure;
      an inlet valve permitting and preventing gas flow into the housing, the inlet valve having an inlet valve head that opens and closes an inlet port of the housing; and
      a filter located within the housing and receiving gas flow downstream the inlet port;
   an outlet valve permitting and preventing gas flow out of the housing through an outlet port located downstream the filter, the outlet valve having an outlet valve body that defines the outlet port and is seated in an outlet opening of the housing and, further, having an outlet valve head that opens and closes the outlet port, the outlet valve head being biased to close the outlet port when the housing is uninstalled from the vehicle structure.

12. The vehicle fuel gas pre-filter unit set forth in claim 11, wherein the housing is installed in the vehicle structure and uninstalled from the vehicle structure via fastened and unfastened threads.

13. The vehicle fuel gas pre-filter unit set forth in claim 11, wherein the housing includes an end cover that defines the outlet opening of the housing and is detachable from a body of the housing that defines the inlet port of the housing.

14. The vehicle fuel gas pre-filter unit set forth in claim 11, wherein the inlet valve has an inlet valve stem extending from the inlet valve head, the inlet valve stem has a terminal end engaging the outlet valve head and urging the outlet valve head away from the outlet valve body to open the outlet valve port when the inlet valve moves to open the inlet port.

15. The vehicle fuel gas pre-filter unit set forth in claim 11, wherein the inlet valve has an inlet valve stem engageable with the outlet valve head, and when the housing is uninstalled from the vehicle structure the inlet valve stem and the outlet valve head are not engaged with each other and the outlet valve head is biased to close the outlet port.

16. The vehicle fuel gas pre-filter unit set forth in claim 11, wherein the housing includes a first plate with a plurality of perforations, a second plate with a plurality of perforations, and a sleeve that extends between the first and second plates and receives an inlet valve stem that extends from the inlet valve head, the filter located between the first and second plates and gas flow passing through the perforations of the first plate and through the filter and through the perforations of the second plate as gas travels from the inlet port to the outlet port.

17. The vehicle fuel gas pre-filter unit set forth in claim 11, further comprising a cap interconnected to the housing for grasping by a user and for installing the housing in the vehicle structure and uninstalling the housing from the vehicle structure, the cap including at least one spring that interacts with the housing to preclude over-torquing when installing the vehicle fuel gas pre-filter unit to the vehicle structure.

18. A vehicle fuel gas pre-filter unit, comprising:
   a housing having a body and an end cover, the end cover being detachable from the body and defining a reservoir;
   an inlet valve head that opens and closes an inlet port in order to permit and prevent gas flow into the housing;
   an inlet valve stem extending from the inlet valve head, the inlet valve stem engageable with an outlet valve head that opens and closes an outlet port in order to permit and prevent gas flow out of the housing such that, when the inlet valve head moves to open the inlet port, the outlet valve head also moves to open the outlet port; and
   a filter located in the body of the housing, the filter removing contaminants from gas flow through the body, at least some of the removed contaminants being received in the reservoir of the end cover, which is located downstream the filter, the contaminants emptiable from the reservoir when the end cover is detached from the body, and the filter removeable from the body when the end cover is detached from the body.

19. The vehicle fuel gas pre-filter unit set forth in claim 18, wherein the housing is uninstallable from a vehicle structure via a set of threads, and when uninstalled the outlet valve head and inlet valve stem are not engaged with each other and the outlet valve head is biased to close the outlet port.

20. The vehicle fuel gas pre-filter unit set forth in claim 18, further comprising a cap interconnected to the housing for grasping by a user and for installing the housing in a vehicle structure and uninstalling the housing from the vehicle structure.

* * * * *